(12) United States Patent
Vu et al.

(10) Patent No.: US 11,112,808 B2
(45) Date of Patent: Sep. 7, 2021

(54) FLUID FLOW RESTRICTOR DEVICE

(71) Applicant: The Boeing Company, Chicago, IL (US)

(72) Inventors: Tuan Q. Vu, Seattle, WA (US); Chao-Hsin Lin, Redmond, WA (US); Taylor Goodwin, Mukilteo, WA (US); Douglas D. Maben, Snohomish, WA (US); Gary A. Pearson, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 27 days.

(21) Appl. No.: 16/456,898

(22) Filed: Jun. 28, 2019

(65) Prior Publication Data
US 2020/0409396 A1   Dec. 31, 2020

(51) Int. Cl.
*F16L 55/027* (2006.01)
*G05D 7/01* (2006.01)
*F16L 55/07* (2006.01)

(52) U.S. Cl.
CPC .......... *G05D 7/0186* (2013.01); *F16L 55/07* (2013.01); *F16L 55/027* (2013.01)

(58) Field of Classification Search
CPC .. G01F 1/42; G01F 15/00; F16L 9/147; F16L 9/19; F16L 39/00; F16L 55/07; F16L 55/027; F15D 1/04
USPC ........ 138/44, 37, 39; 73/272 R, 198, 861.61, 73/861.63; 285/412
See application file for complete search history.

(56) References Cited

U.S. PATENT DOCUMENTS

| | | | | |
|---|---|---|---|---|
| 1,298,471 A * | 3/1919 | Dodge | ...................... | G01F 1/42 73/861.61 |
| 1,559,155 A * | 10/1925 | Bullock | .................... | G01F 1/44 73/861.61 |
| 1,658,699 A * | 2/1928 | Weiss | ...................... | G01F 1/372 336/30 |
| 1,802,766 A * | 4/1931 | Kerr | ........................ | F16L 55/00 138/44 |
| 3,680,376 A * | 8/1972 | Catheron | .................. | G01F 1/42 73/861.61 |
| 4,142,413 A * | 3/1979 | Bellinga | ................. | G01F 15/00 73/198 |
| 4,381,668 A * | 5/1983 | Sato | ........................ | G01F 1/684 73/202.5 |
| 7,845,688 B2 * | 12/2010 | Gallagher | ............... | F16L 9/147 285/412 |
| 9,506,432 B2 * | 11/2016 | Inoue | .................. | F02M 35/1283 |

(Continued)

*Primary Examiner* — Patrick F Brinson
(74) *Attorney, Agent, or Firm* — von Briesen & Roper, s.c.

(57) ABSTRACT

A fluid flow restrictor device for controlling fluid flow at a connection between ducts may include a restrictor device body that is partially or fully inserted into and disposed within one of the ducts and an outboard restrictor device flange extending radially outward at an outboard end of the restrictor device body and having an outboard flange outer diameter that is greater than an inner diameter of the ducts so that the restrictor device body or the outboard restrictor device flange is engaged by an open end surface of the duct to prevent full insertion of the fluid flow restrictor device into the duct. A body inner surface defines a restrictor opening through the restrictor device body that can be varied to achieve desired fluid flow characteristics at the connection.

20 Claims, 8 Drawing Sheets

(56) References Cited

U.S. PATENT DOCUMENTS

| | | | |
|---|---|---|---|
| 10,260,537 B2* | 4/2019 | Sawchuk | F15D 1/001 |
| 2008/0246277 A1* | 10/2008 | Gallagher | F16L 39/00 |
| | | | 285/148.13 |
| 2017/0192440 A1 | 7/2017 | Vandyke | |

* cited by examiner

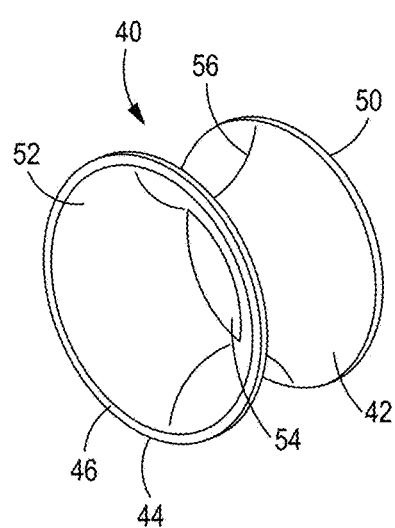 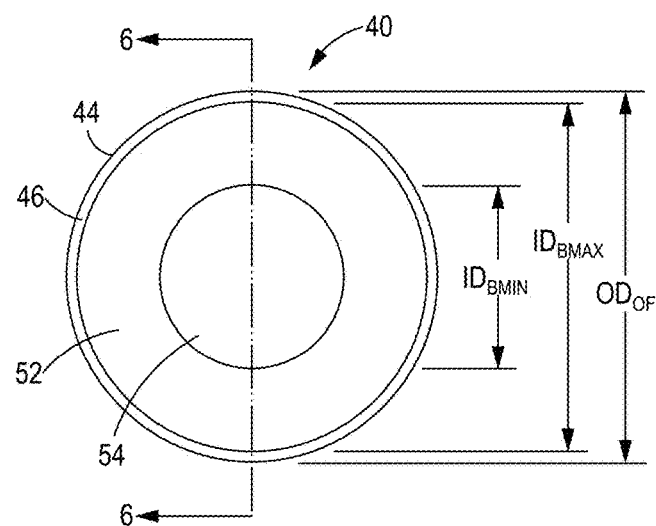
FIG. 3　　　　　　　FIG. 4
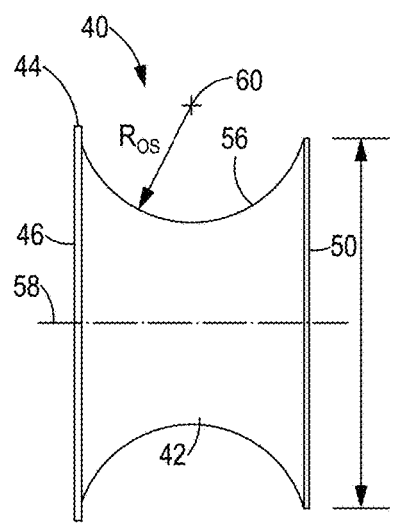 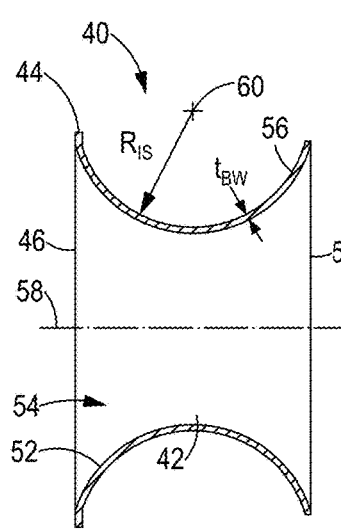 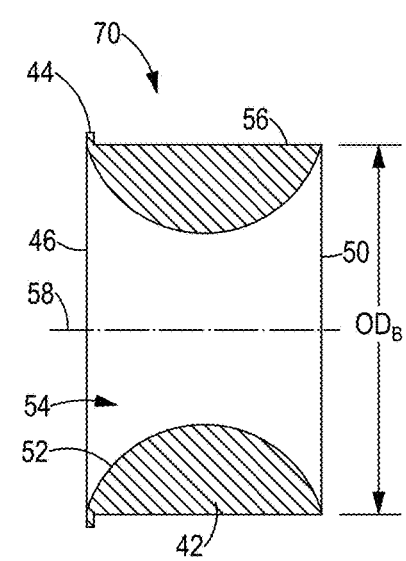
FIG. 5　　　FIG. 6　　　FIG. 7

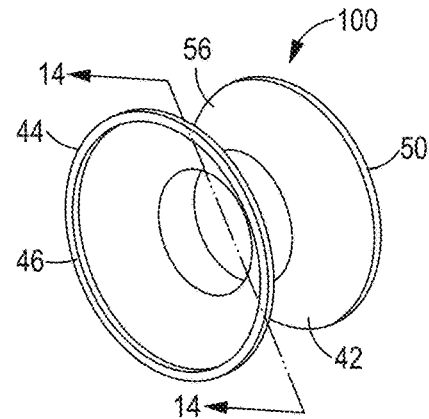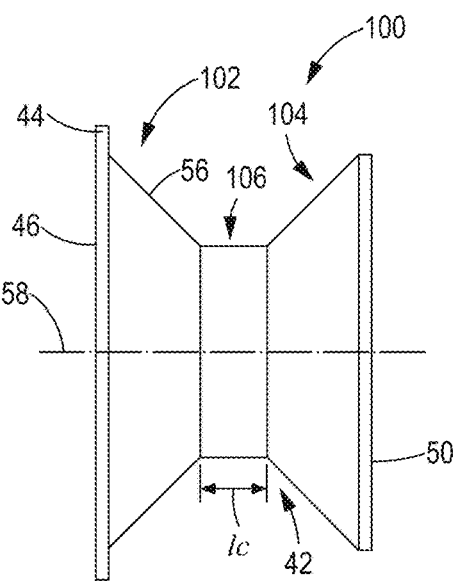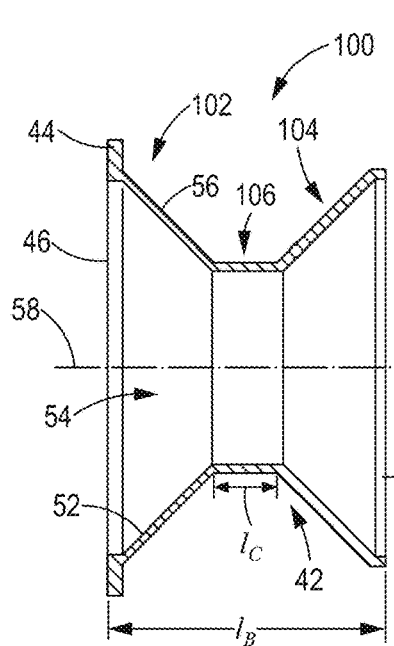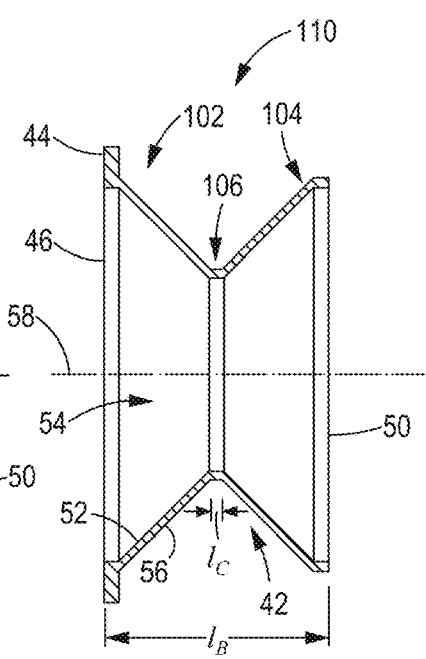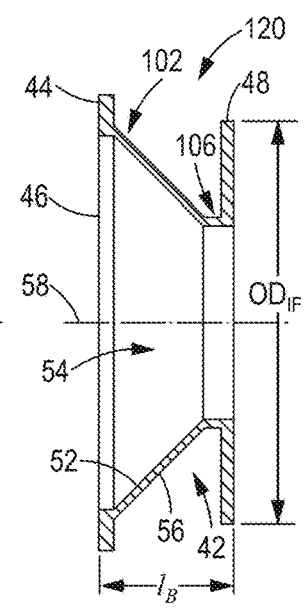
*FIG. 12*  *FIG. 13*
*FIG. 14*  *FIG. 15*  *FIG. 16*

FLUID FLOW RESTRICTOR DEVICE

TECHNICAL FIELD

The present disclosure relates generally to flow control device for use on ducting arrangements and, more particularly, to a fluid flow restrictor device that is inserted into one of the ducts at a connection between two ducts.

BACKGROUND

Certain structural assemblies might require specified amounts of fluid flow, such as airflow, to be circulated throughout the structure. The required airflow might, for instance, be related to passenger comfort within a vehicle in which the structural assembly is implemented. Alternatively or in addition, the required airflow might relate to functional aspects of how the vehicle is meant to perform due to its overall design. Such structural assemblies usually employ a plurality of ducts that are routed throughout the structure so that the airflow can be contained and controlled within such ducts.

One common method to provide ducting is via the use of angled channels or tubes that might vary in thickness and shape due to various design constraints that are associated with providing the required airflow. When designing the layout of ducts within a structure, it is known that airflows will need to be adjusted in the finished structure despite careful considerations during the design phase. Accordingly, the ducting layout will purposefully include breaks in the channels or tubing so that flow restrictors can be installed at those break points. Previous flow restrictors include orifice plates installed between the end surfaces of the ducts connected at the break points. Known orifice plates typically have a series of holes or throughputs that are calibrated to provide and adjust airflow according to needed structural design constraints.

SUMMARY OF THE DISCLOSURE

In one aspect of the present disclosure, a fluid flow restrictor device for controlling fluid flow at a connection between a first duct and a second duct is disclosed. The fluid flow restrictor device may include a restrictor device body having an outboard end, an inboard end that is inserted into and disposed within the first duct when the fluid flow restrictor device is installed at the connection, a body inner surface defining a restrictor opening through the restrictor device body from the outboard end to the inboard end, and a body outer surface. The fluid flow restrictor device may further include an outboard restrictor device flange extending radially outward at the outboard end of the restrictor device body and having an outboard flange outer diameter that is greater than a first duct inner diameter of the first duct so that the outboard restrictor device flange is engaged by a first duct open end surface of the first duct to prevent full insertion of the fluid flow restrictor device into the first duct when the fluid flow restrictor device is installed at the connection.

In another aspect of the present disclosure, a fluid flow system is disclosed. The fluid flow system may include a first duct having a first duct inner surface with a first duct inner diameter and a first duct open end surface, a second duct having a second duct inner surface with a second duct inner diameter and a second duct open end surface, and a fluid flow restrictor device. The fluid flow restrictor device may include a restrictor device body having an outboard end, an inboard end, a body inner surface defining a restrictor opening through the restrictor device body from the outboard end to the inboard end, and a body outer surface, and an outboard restrictor device flange extending radially outward at the outboard end of the restrictor device body and having an outboard flange outer diameter that is greater than the first duct inner diameter. The inboard end may be inserted into the first duct until the outboard restrictor device flange is engaged by the first duct open end surface to prevent full insertion of the fluid flow restrictor device into the first duct. The fluid flow system may also include a duct connection mechanism engaging the first duct and the second duct to substantially prevent relative movement between the first duct and the second duct and to retain the fluid flow restrictor device installed within the first duct.

In a further aspect of the present disclosure, a method of controlling fluid flow at a connection between a first duct and a second duct is disclosed. The method may include inserting an inboard end of a restrictor device body of a fluid flow restrictor device through a first duct open end surface and into the first duct, wherein a portion of the fluid flow restrictor device has an outer diameter that is greater than a first duct inner diameter of a first duct inner surface so that the portion of the fluid flow restrictor device is engaged by the first duct to prevent an outboard end of the fluid flow restrictor device from being completely inserted into the first duct, and wherein the restrictor device body has a body inner surface extending through the restrictor device body from the outboard end to the inboard end and defining a restrictor opening through the fluid flow restrictor device. The method may further include contacting the outboard end of the fluid flow restrictor device with a second duct open end surface of the second duct, and engaging the first duct and the second duct with a duct connection mechanism to substantially prevent relative movement between the first duct and the second duct and to form a seal between the first duct, the second duct and the fluid flow restrictor device.

Additional aspects are defined by the claims of this patent.

BRIEF DESCRIPTION OF THE DRAWINGS

FIG. 3 is an isometric view of the fluid flow restrictor device of FIG. 1;

FIG. 4 is an end view of the fluid flow restrictor device of FIG. 3;

FIG. 5 is a side view of the fluid flow restrictor device of FIG. 3,

FIG. 6 is a cross-sectional view of the fluid flow restrictor device of FIG. 3 taken through line 6-6 of FIG. 4;

FIG. 7 is a cross-sectional view of an alternative embodiment of a fluid flow restrictor device in accordance with the present disclosure;

FIG. 12 is an isometric view of a still further alternative embodiment of a fluid flow restrictor device in accordance with the present disclosure;

FIG. 13 is a side view of the fluid flow restrictor device of FIG. 12;

FIG. 14 is a side cross-sectional view of the fluid flow restrictor device of FIG. 12 taken through line 14-14 of FIG. 12;

FIG. 15 is a cross-sectional view of an additional alternative embodiment of a fluid flow restrictor device in accordance with the present disclosure;

FIG. 16 is a cross-sectional view of an alternative embodiment of a fluid flow restrictor device in accordance with the present disclosure;

DETAILED DESCRIPTION

Figure 1:
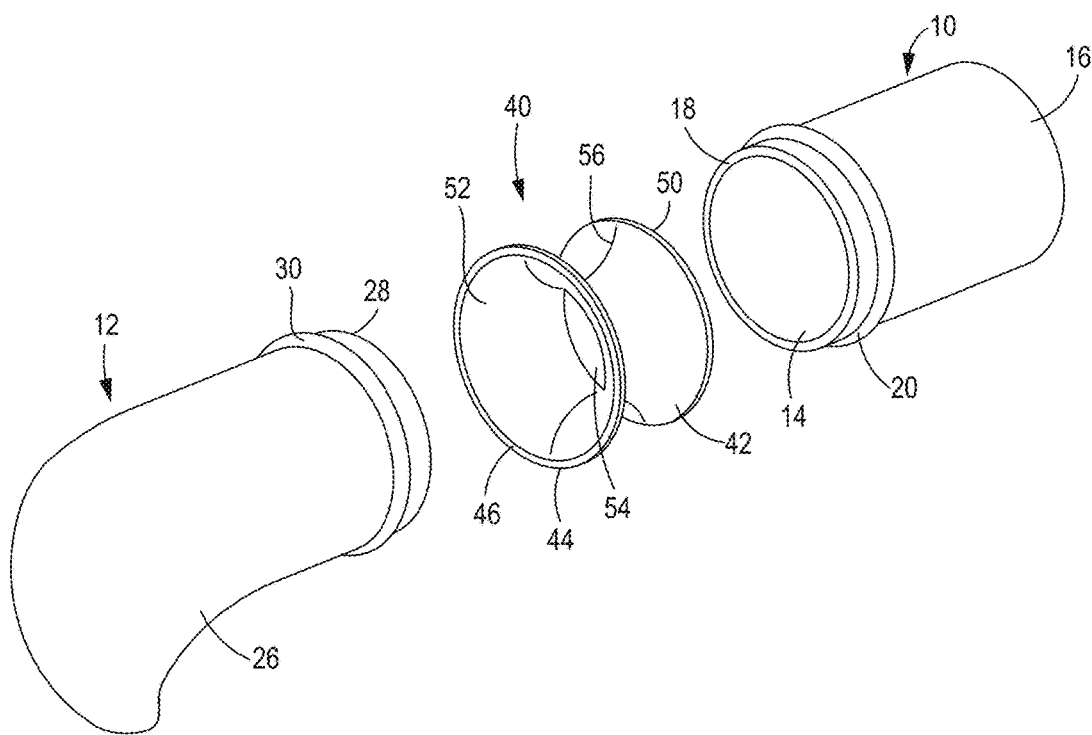
FIG. 1 is an isometric view of a connection in a duct system including a first duct, a second duct and a fluid flow restrictor device in accordance with the present disclosure.
Figure 2:
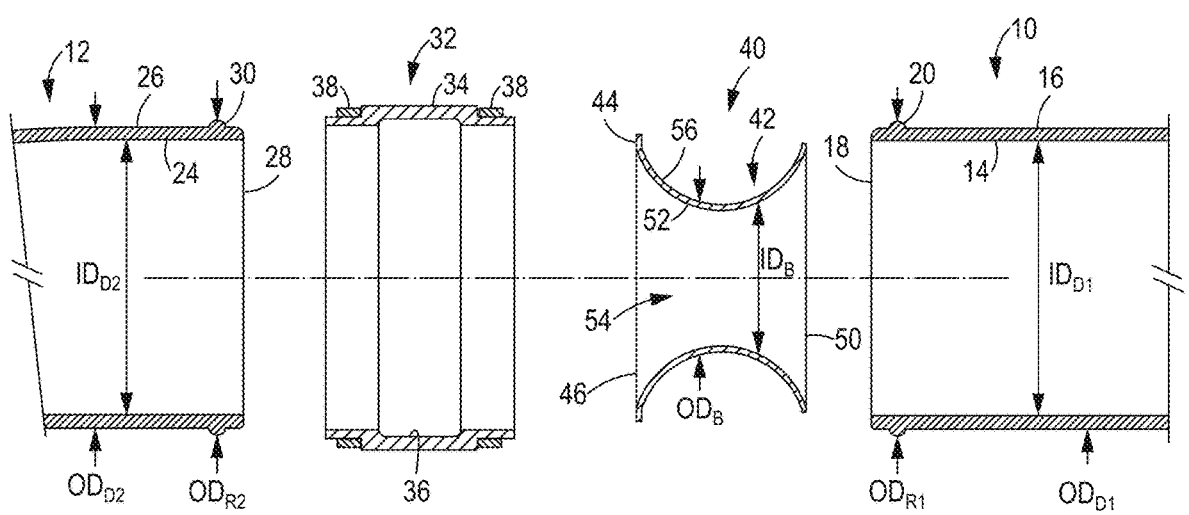
FIG. 2 is a side cross-sectional view of the components at the connection of FIG. 1 and a duct connection mechanism.

FIGS. 1 and 2 illustrate an example of components that will be combined at a break in a ducting system to provide fluid flow control through the ducting system in the area of the connection. Referring to FIG. 1, the break is between a first duct 10 and a second duct 12. The first duct 10 has a first duct inner surface 14 (FIG. 2) with a first duct inner diameter $ID_{D1}$, a first duct outer surface 16 with a first duct outer diameter $OD_{D1}$, and a first duct open end surface 18. The first duct 10 may also include a first duct annular rib 20 extending radially outward from the first duct outer surface 16 with a first rib outer diameter $OD_{R1}$. The second duct 12 may similarly have a second duct inner surface 24 with a second duct inner diameter $ID_{D2}$, a second duct outer surface 26 with a second duct outer diameter $OD_{D2}$, a second duct open end surface 28, and a second duct annular rib 30 with a second rib outer diameter $OD_{R2}$. In most implementations, the first duct inner diameter $ID_{D1}$, the first duct outer diameter $OD_{D1}$ and the first rib outer diameter $OD_{R1}$ are approximately equal to the second duct inner diameter $ID_{D2}$, the second duct outer diameter $OD_{D2}$ and the second rib outer diameter $OD_{R2}$, but the dimensions of the ducts 10, 12 may have different values in some ducting systems.

The duct annular ribs 20, 30 are configured to be engaged by a duct connection mechanism 32 (FIG. 2) that engages the ducts 10, 12 to form a seal at the connection and to substantially prevent relative movement between the ducts 10, 12. In the illustrated embodiment, the duct connection mechanism 32 includes a sleeve 34 having an annular groove 36, and a pair of tension rings 38. As illustrated and described further below, the sleeve 34 may slide over the duct open end surfaces 18, 28 until the duct annular ribs 20, 30 are received by the groove 36 to join the ducts 10, 12 together and substantially prevent relative movement there between. The installed sleeve 34 and the groove 36 may also form a seal to prevent leakage of fluid at the connection. The sleeve 34 is merely exemplary of duct connection mechanisms that may connect the ducts 10, 12 and prevent relative movement, and those skilled in the art will understand that alternative connection mechanisms may be used and are contemplated by the inventors.

Flow from one of the ducts 10, 12 through the other of the ducts 10, 12 is controlled by a fluid flow restrictor device 40. The following discussion may us the terms "fluid flow" and "airflow" interchangeably, and it should be understood that fluid flow restrictor devices in accordance with the present disclosure may be used to control the flow of air, liquids or other fluids being transported from one conduit to another conduit. The fluid flow restrictor device 40 is designed to be partially inserted into one of the ducts 10, 12, such as into the first duct 10 as illustrated and described herein. Moreover, the fluid flow restrictor device 40 may be inserted into either an upstream duct or a downstream duct relative to the direction of the fluid flow depending on the fluid flow control requirements for a particular implementation of the fluid flow restrictor device 40.

The fluid flow restrictor device 40 is representative of the fluid flow restrictor devices illustrated and described herein. The fluid flow restrictor device 40 includes a restrictor device body 42 that is configured to be inserted into one of the ducts 10, 12 (first duct 10 as oriented in FIG. 2), and an outboard restrictor device flange 44 extending radially outward at an outboard end 46 of the restrictor device body 42. An inboard restrictor device flange 48 (FIG. 16) may extend radially outward from an inboard end 50 of the restrictor device body 42.

The restrictor device body 42 further includes a body inner surface 52 extending from the outboard end 46 to the inboard end 50. The body inner surface 52 may have a variable body inner diameter $ID_B$ and defines a restrictor opening 54 through the restrictor device body 42 that is configured to change a fluid pressure and fluid velocity of a fluid flowing through the ducting system in a predetermined manner. Various alternative configurations for the body inner surface 52 and the restrictor opening 54 are illustrated in the drawing figures and discussed in detail below. The restrictor device body 42 also has a body outer surface 56 extending from the outboard restrictor device flange 44 to the inboard restrictor device flange 48 or to the inboard end 50 in embodiments without the inboard restrictor device flange 48. The body outer surface 56 may have either a variable body outer diameter $OD_B$ (FIG. 5) or a variable body outer diameter $OD_B$ (FIG. 7) to configure the restrictor device body 42 as necessary for a particular implementation. In any embodiment, at least a portion of the outer body diameter $OD_B$ is less than the first duct inner diameter $ID_{D1}$ so that the corresponding portion of the restrictor device body 42 is insertable through the first duct open end surface 18 and into the first duct 10. If the outer body diameter $OD_B$ is less than the first duct inner diameter $ID_{D1}$ along the entire body outer surface 56, the restrictor device body 42 will be inserted until the outboard restrictor device flange 44 is engaged by the first duct open end surface 18. If a portion of the outer body diameter $OD_B$ is greater than the first duct inner diameter $ID_{D1}$, the restrictor device body 42 will be inserted until the outer body diameter $OD_B$ is equal to the first duct inner diameter $ID_{D1}$ and the edge at the intersection of the first duct inner surface 14 and the first duct open end surface 18 engages the body outer surface 56 to prevent further insertion.

FIGS. 3-6 illustrate the fluid flow restrictor device 40 in greater detail. The end view of FIG. 4 illustrates the difference in the body inner diameter $ID_B$ of the body inner surface 52 and the corresponding restrictor opening 54 from a maximum body inner diameter $ID_{BMAX}$ at the outboard end 46 and a minimum body inner diameter $ID_{BMIN}$ within the restrictor device body 42. An outboard flange outer diameter $OD_{OF}$ is greater than the maximum body inner diameter $ID_{BMAX}$ and the first duct inner diameter $ID_{D1}$. In some embodiments, the outboard flange outer diameter $OD_{OF}$ may also be greater than the first duct outer diameter $OD_{D1}$, and even greater than the first duct annular rib outer diameter $OD_{R1}$. In the illustrated embodiment, the restrictor opening 54 has an aspect ratio between the maximum body inner diameter $ID_{BMAX}$ and the minimum body inner diameter $ID_{BMIN}$ of approximately 2-to-1. This aspect ratio is exemplary, and the aspect ratio in a particular embodiment of a fluid flow restrictor device may be greater than or less than 2-to-1 depending on the requirements for controlling the fluid flow through the ducts 10, 12.

Also in the illustrated embodiment, the restrictor device body 42 may be characterized as having a hyperboloid shape. As seen in the side view of FIG. 5, the fluid flow restrictor device 40 of the present embodiment is symmetrical about a body longitudinal axis 58. When viewed from the side, the body outer surface 56 has a constant radius of curvature $R_{OS}$ about a center point 60 lying outside the restrictor device body 42. As seen in the cross-sectional view of FIG. 6, with the cross-section being taken through a plane parallel to the body longitudinal axis 58 and having the body longitudinal axis 58 lying within the sectioning plane, the body inner surface 52 has a constant radius of curvature $R_{IS}$ about the center point 60. Because the radii of curvature $R_{OS}$, $R_{IS}$ are constant and in reference to the center point 60, the curvatures of the body surfaces 52, 56 correspond as the body surfaces 52, 56 extend from the outboard end 46 toward the inboard end 50 such that a body wall thickness $t_Bw$ (FIG. 6) is approximately constant.

FIG. 6 further illustrates that the body inner diameter $ID_B$ decreases as the body inner surface 52 extends from the outboard end 46 toward the inboard end 50 until reaching the minimum body inner diameter $ID_{BMIN}$. After the point at which the body inner diameter $ID_B$ is equal to the minimum body inner diameter $ID_{BMIN}$, the body inner diameter $ID_B$ will increase as the body inner surface 52 extends further toward the inboard end 50. The curvature of the body inner surface 52 will also result in the body inner diameter $ID_B$ having an inner diameter rate of change that is at a maximum proximate the outboard end 46, and decreases as the body inner surface 52 extends toward the inboard end 50. The inner diameter rate of change is zero and the body inner diameter $ID_B$ does not change momentarily when the body inner surface 52 reaches the point of the minimum body inner diameter $ID_{BMIN}$, and then increases as the body inner surface 52 continues to extend toward the inboard end 50.

FIG. 7 illustrates an alternative embodiment of a fluid flow restrictor device 70 having a constant body outer diameter $OD_B$. In this and in subsequent alternative embodiments, the same elements of fluid flow restrictor devices will be identified using the same reference numerals and dimension identifications as the fluid flow restrictor device 40 for the sake of clarity and reduction of redundant descriptions in the discussions of the various embodiments. The restrictor device body 42 of the fluid flow restrictor device 70 has a cylindrical shape due to the constant body outer diameter $OD_B$ of the body outer surface 56. The body outer diameter $OD_B$ is less than the first duct inner diameter $ID_{D1}$ to allow insertion of the restrictor device body 42 into the first duct 10. The body inner surface 52 and the restrictor opening 54 have the same hyperboloid shape as in the fluid flow restrictor device 40.

The fluid flow restrictor devices 40, 70, and the other embodiments of fluid flow restrictor devices in accordance with the present disclosure may be fabricated from materials that facilitate desired fluid flow over the body inner surface 52, and provide noise attenuation as the fluid flows through the restrictor opening 54. Such materials may include rigid open cell foam, thermoplastic materials, rigid polyurethane, polyvinyl chloride (PVC), and the like. Various manufacturing methods and techniques are contemplated for fabricating the fluid flow restrictor devices, such as molding or casting the materials to the shape of the fluid flow restrictor devices, machining the fluid flow restrictor devices from larger blocks of material, three-dimensional (3D) printing the fluid flow restrictor devices from the selected material, or using other methods or combinations of manufacturing methods as will be apparent to those skilled in the art and are contemplated by the inventors. The appropriate manufacturing methods may also be used to apply desired surface textures for desired roughness or smoothness, and to achieve desired body wall thicknesses $t_{BW}$.

Figure 8:
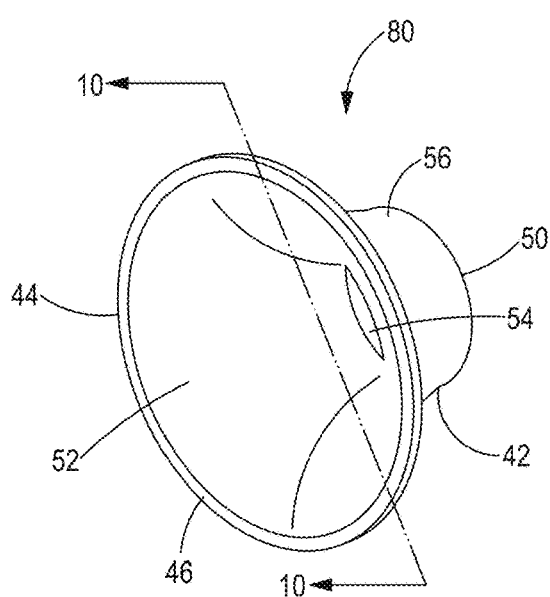
FIG. 8 is an isometric view of another alternative embodiment of a fluid flow restrictor device in accordance with the present disclosure.
Figure 9:
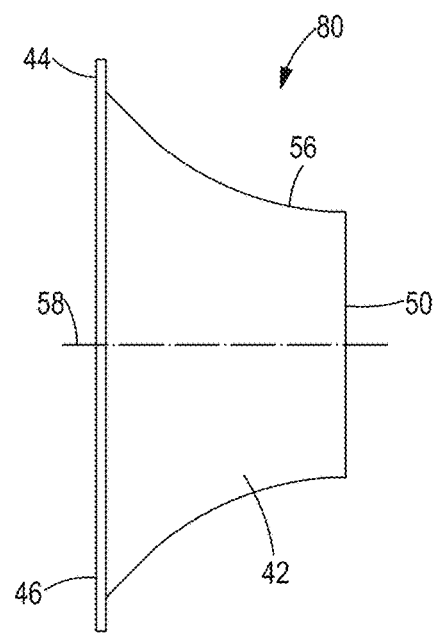
FIG. 9 is a side view of the fluid flow restrictor device of FIG. 8.
Figure 10:
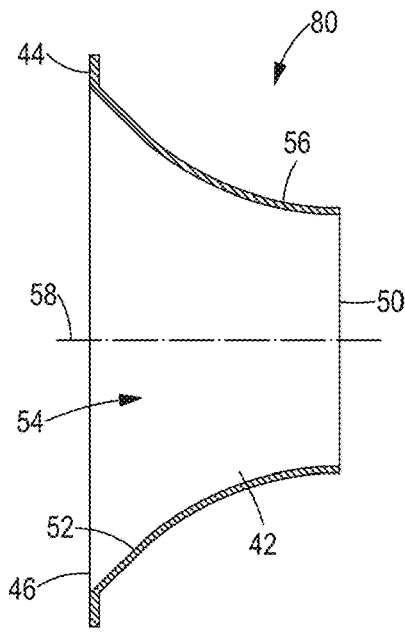
FIG. 10 is a side cross-sectional view of the fluid flow restrictor device of FIG. 8 taken through line 10-10 of FIG. 8.

FIGS. 8-10 illustrate an alternative embodiment of a fluid flow restrictor device 80 wherein the restrictor device body 42 has a funnel shape. In this embodiment, the body inner surface 52 and the body outer surface 56 extend from the outboard end 46 with the body inner diameter $ID_B$ decreasing until the body surfaces 52, 56 reach the inboard end 50 where the body inner surface 52 has the minimum body inner diameter $ID_{BMIN}$. The body surfaces 52, 56 do not have a constant radius of curvature in this embodiment, and may curve according to a parabolic equation. However, the inner diameter rate of change of the body inner diameter $ID_B$ still decreases as the body inner surface 52 extends from the outboard end 46, but decreases at a different rate than the body inner surfaces 52 in the fluid flow restrictor devices 40, 70.

Figure 11:
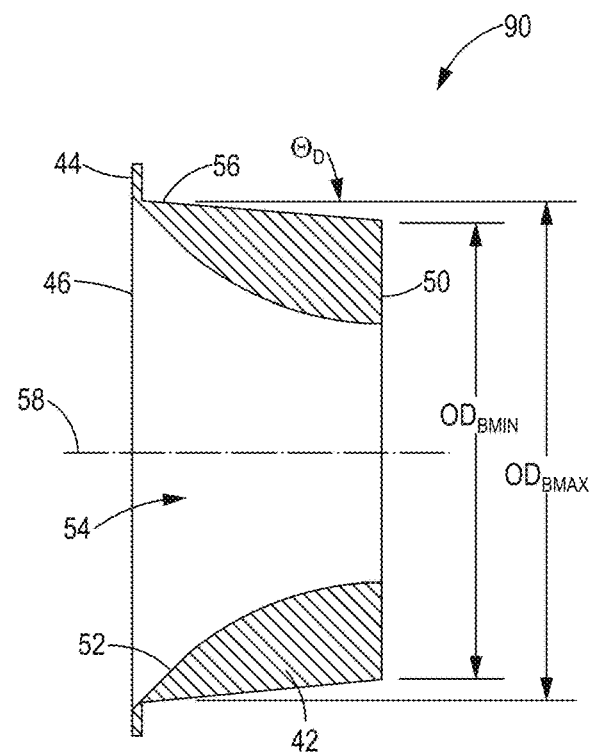
FIG. 11 is a cross-sectional view of a further alternative embodiment of a fluid flow restrictor device in accordance with the present disclosure.

In alternative embodiments, the body outer surface 56 of the fluid flow restrictor device 80 may be cylindrical and have a constant body outer diameter $OD_B$ similar to the body outer surface 56 in the fluid flow restrictor device 70, FIG. 11 illustrates a further alternative embodiment of a fluid flow restrictor device 90 wherein the restrictor device body 42 is tapered as the restrictor device body 42 extends from the outboard end 46 toward the inboard end 50. The outer body diameter $OD_B$ of the body outer surface 56 may decrease as the body outer surface 56 extends toward the inboard end 50. As illustrated, an outer diameter rate of change of the outer body diameter $OD_B$ is constant as the outer body diameter $OD_B$ decreases to a minimum outer diameter $OD_{BMIN}$ to create a draft angle $\theta_D$ that allows all or a portion of the restrictor device body 42 to be inserted into the first duct 10. In one embodiment, a maximum body outer diameter $OD_{BMAX}$ proximate the outboard restrictor device flange 44 is less than the first duct inner diameter $ID_{D1}$ so that, the restrictor device body 42 is fully inserted until the outboard restrictor device flange 44 is engaged by the first duct open end surface 18. In other embodiments, the maximum body outer diameter $OD_{BMAX}$ is greater than the first duct inner diameter $ID_{D1}$ so that the restrictor device body 42 is inserted until the outer body diameter $OD_B$ is equal to the first duct inner diameter $ID_{D1}$ and engaged by an edge at the intersection of the first duct inner surface 14 and the first duct open end surface 18 to wedge the restrictor device body 42 into the first duct 10 like a cork in a bottle as illustrated and described further below. In further alternative embodiments, the body outer surface 56 of the fluid flow restrictor device 90 may have an outer diameter rate of change that is variable and either increases or decreases as the body outer surface 56 extends from the outboard restrictor device flange 44 and the outer body diameter $OD_B$ decreases. Those skilled in the art will understand that the cylindrical body outer surface 56 or the tapered body outer surface 56 may be implemented in any of the fluid flow restrictor devices illustrated and described herein.

FIGS. 12-14 illustrate a fluid flow restrictor device 100 wherein the restrictor device body 42 approximates the shape of a venturi tube. The restrictor device body 42 of the fluid flow restrictor device 100 has an entry cone 102 proximate the outboard end 46, an exit cone 104 proximate the inboard end 50, and a constriction section 106 disposed there between. In the entry cone 102, the rates of change of the body inner diameter $ID_B$ and the outer body diameter $OD_B$ may be constant as the body surfaces 52, 56 extend from the outboard end 46 toward the constriction section 106 and the body inner diameter $ID_B$ decreases to the minimum body inner diameter $ID_{BMIN}$. The body inner diameter $ID_B$ remains constant at the minimum body inner diameter $ID_{BMIN}$ as the body surfaces 52, 56 extend through the constriction section 106 for a constricted section length $I_C$ (FIG. 13), and then increases at a constant rate of change as the body surfaces 52, 56 extend through the exit cone 104 to the inboard end 50. In an alternative fluid flow restrictor device 110 shown in FIG. 15, the constricted section length $I_C$ of the constriction section 106 may be reduced so that the restrictor device body 42 more closely approximates a V-shape when viewed from the side. In some embodiments, the constriction section 106 may be omitted between the cones 102, 104 such that the body inner diameter $ID_B$ will reach the minimum body inner diameter $ID_{BMIN}$ at the intersection of the cones 102, 104 and immediately begin to increase as the body surfaces 52, 56 extend in either direction into the cones 102, 104. FIG. 16 illustrates a further alternative embodiment of a fluid flow restrictor device 120 having a cup shape where the exit cone 104 is omitted and the inboard restrictor device flange 48 having an outboard flange outer diameter $OD_{IF}$ is installed at the inboard end of the constriction section 106. The inboard flange outer diameter $OD_{IF}$ is less than the first duct inner diameter $ID_{D1}$ to allow insertion of the inboard restrictor device flange 48 and the restrictor device body 42 into the first duct 10. In further alternative embodiments, the constriction section 106 may also be omitted and the inboard restrictor device flange 48 may be installed at the inboard end of the entry cone 102.

Figure 17:
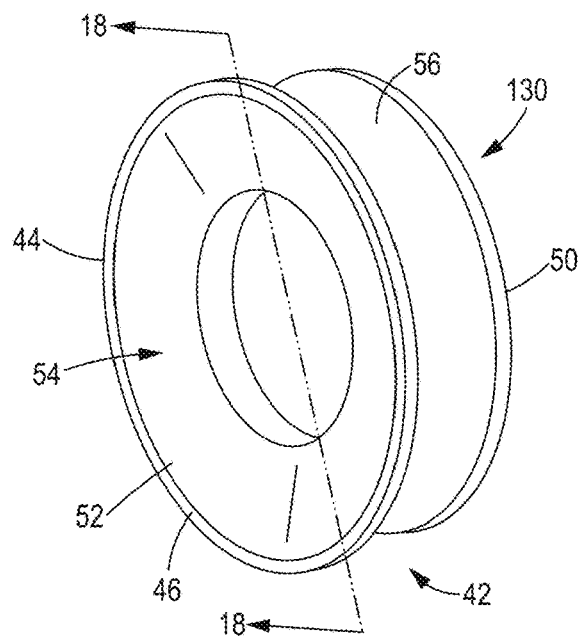
FIG. 17 is an isometric view of a further alternative embodiment of a fluid flow restrictor device in accordance with the present disclosure.
Figure 18:
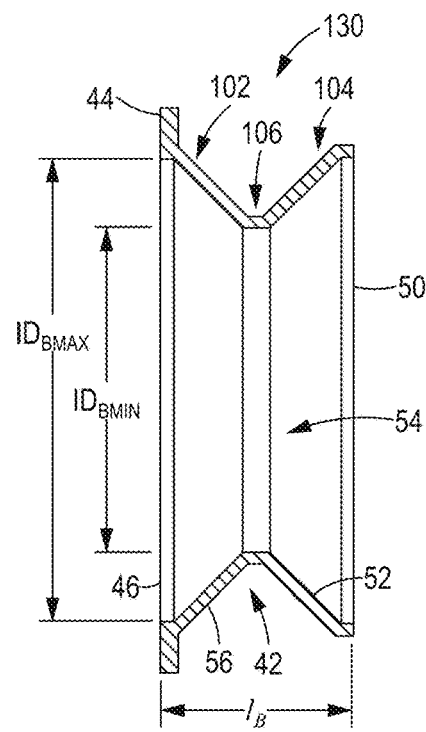
FIG. 18 is a cross-sectional view of the fluid flow restrictor device of FIG. 17 taken through line 18-18 of FIG. 17.

FIGS. 17 and 18 provide a further alternative in the venturi tube and V-shaped embodiments wherein a body length in (FIGS. 14-16 and 18) is decreased to achieve desired flow restriction characteristics. In a fluid flow restrictor device 130, the entry cone 102 and the exit cone 104 may have the same rates of change in the body inner diameter $ID_B$ and the outer body diameter $OD_B$ as in the fluid flow restrictor device 120, but the shorter body length $I_B$ results in an increase in the minimum body inner diameter $ID_{BMIN}$ and corresponding decrease in the aspect ratio between the maximum body inner diameter $ID_{BMAX}$ and the minimum body inner diameter $ID_{BMIN}$. To maintain the minimum body inner diameter $ID_{BMIN}$ and the aspect ratio, the rates of change of the body inner diameter $ID_B$ and the outer body diameter $OD_B$ may be increased to flatten the cones 102, 104 when the body length $I_B$ is decreased. In similar manners, the constricted section length $I_C$, the body length $I_B$ and rates of change of the body inner diameter $ID_B$ can be varied to achieve the desired fluid flow restriction characteristics.

Figure 19:
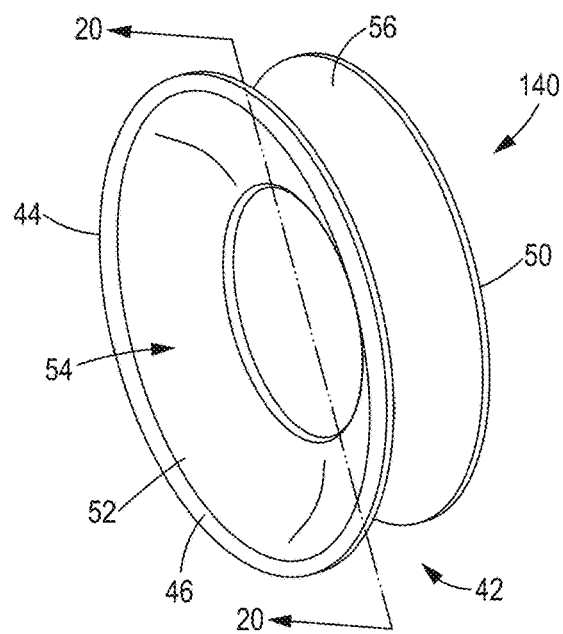
FIG. 19 is an isometric view of another alternative embodiment of a fluid flow restrictor device in accordance with the present disclosure.
Figure 20:
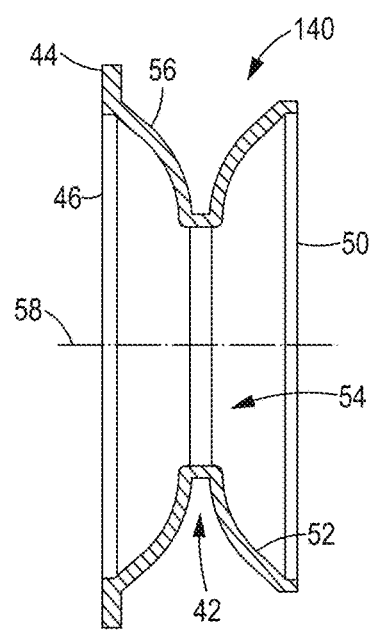
FIG. 20 is a cross-sectional view of the fluid flow restrictor device of FIG. 19 taken through line 20-20 of FIG. 19.

FIGS. 19 and 20 illustrate an embodiment of a fluid flow restrictor device 140 having a bowl shape at the outboard end 46 of the restrictor device body 42. The body surfaces 52, 56 are curved to present a concave shape to fluid entering through the outboard end 46 of the fluid flow restrictor device 140. In this embodiment, the rates of change of the body inner diameter $ID_B$ and the body outer diameter $OD_B$ are lowest proximate the outboard end 46 and increase as the body inner surface 52 and the body outer surface 56 extend toward the inboard end 50. After the minimum body inner diameter $ID_{BMIN}$ at the constriction section 106, the rates of change of the body inner diameter $ID_B$ and the body outer diameter $OD_B$ decrease as the body surfaces 52, 56 extend on to the inboard end 50.

Figure 21:
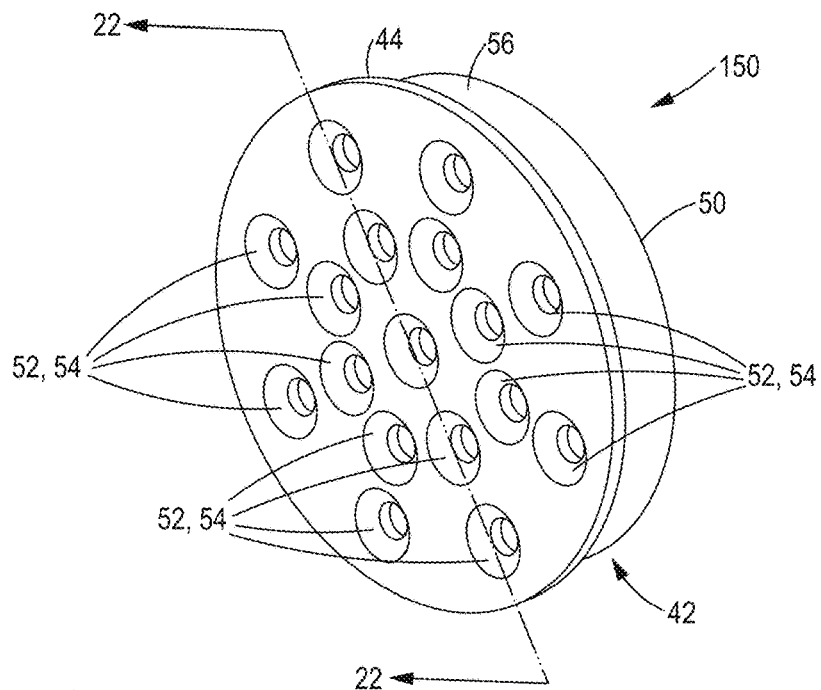
FIG. 21 is an isometric view of an additional alternative embodiment of a fluid flow restrictor device in accordance with the present disclosure.
Figure 22:
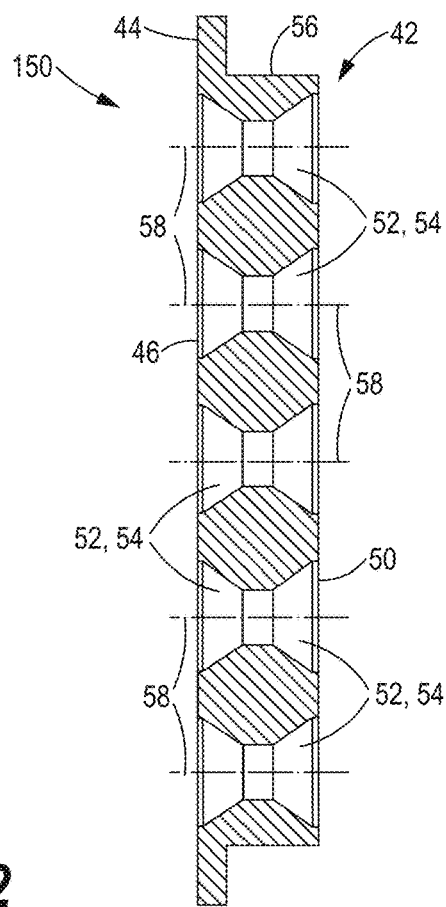
FIG. 22 is a side cross-sectional view of the fluid flow restrictor device of FIG. 21 taken through line 22-22 of FIG. 21.

FIGS. 21 and 22 illustrate a further alternative embodiment of a fluid flow restrictor device 150 having a plurality of body inner surfaces 52 each defining a restrictor opening 54 through the restrictor device body 42. As illustrated, the restrictor opening 54 are the venturi tube-type restrictor openings 54, but any of the restrictor opening 54 illustrated and described herein may be implemented in the fluid flow restrictor device 150. The restrictor openings 54 are spaced about the restrictor device body 42 and their sizes and configurations may be varied to achieve a desired flow control by the fluid flow restrictor device 150, Moreover, the restrictor device body 42 still extends toward the inboard end 50 so that the restrictor device body 42 is insertable into the first duct 10.

INDUSTRIAL APPLICABILITY

Figure 23:
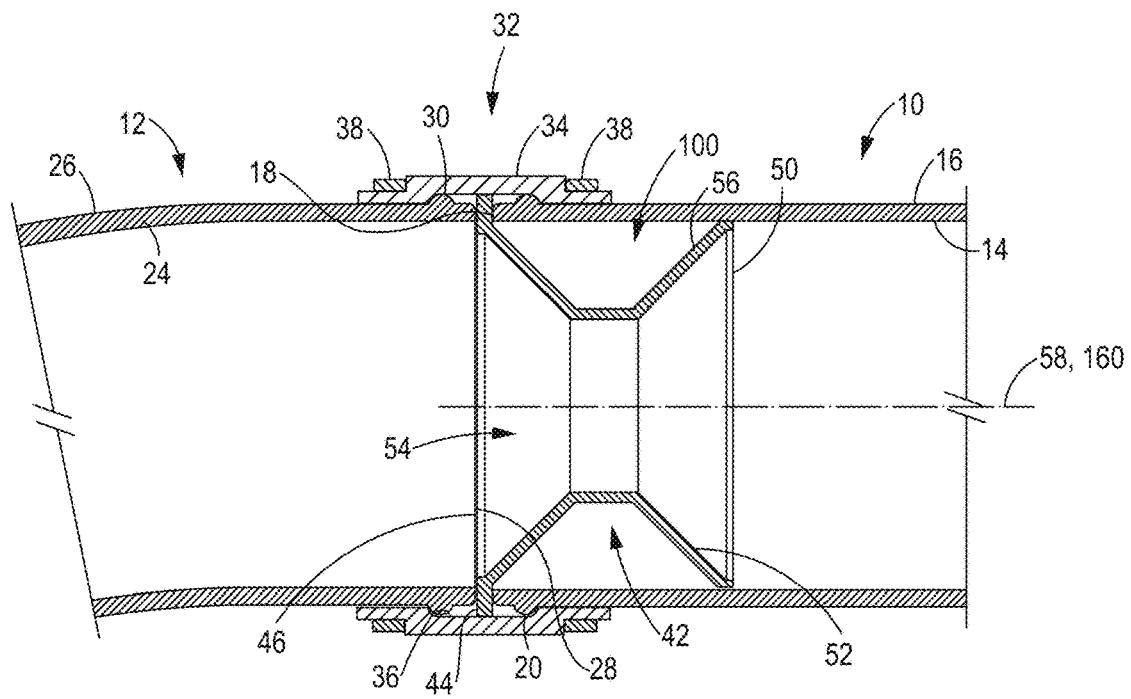
FIG. 23 is a side cross-sectional view of the components at the connection of FIG. 1 with the fluid flow restrictor device of FIG. 12 installed with the ducts.

The various fluid flow restrictor devices illustrated and described above and variations thereof may be selected and configured as appropriate for a particular application in a ducting system. FIG. 23 illustrates one implementation wherein the fluid flow restrictor device 100 is installed at the break between the ducts 10, 12. The restrictor device body 42 is inserted into the first duct 10 until the outboard restrictor device flange 44 is engaged by the first duct open end surface 18. The outer body diameter $OD_B$ at the body outer surface 56 and the center point 60 are large enough to fit snuggly within the first duct 10 so that the fluid flow restrictor device 100 maintains alignment with the body longitudinal axis 58 oriented along a first duct longitudinal axis 160, With the fluid flow restrictor device 100 installed in the first duct 10, the second duct open end surface 28 of the second duct 12 may be brought into contact with the outboard restrictor device flange 44 of the fluid flow restrictor device 100 to secure the outboard restrictor device flange 44 between the duct open end surfaces 18, 28. The sleeve 34 may be slid over one of the duct open end surfaces 18, 28 before the ducts 10, 12 are brought together and the other of the duct open end surfaces 18, 28 is inserted into the opposite end of the sleeve 34. The sleeve 34 may be adjusted on the ducts 10, 12 until the duct annular ribs 20, 30 are captured within the groove 36. The groove 36 may be narrow enough to apply force to press the ducts 10, 12 together and tighten the duct open end surfaces 18, 28 down on the outboard restrictor device flange 44 to assist in forming a seal. With the sleeve 34 installed and positioned, the tension rings 38 slide over the ends of the sleeve 34 and press the sleeve 34 against the duct outer surfaces 16, 26 to further seal the connection of the ducts 10, 12.

In most implementations, the second duct 12 is the upstream duct and the first duct 10 is the downstream duct. In such cases, the fluid flows through the restrictor opening 54 from the outboard end 46 to the inboard end 50. However, in some implementations, the selected fluid flow restrictor device may be inserted into the upstream duct. The fluid flow restrictor devices where the outer body diameter $OD_B$ or an inboard flange outer diameter $OD_{IF}$ at the inboard end 50 is close to the first duct inner diameter $ID_{D1}$, such as the fluid flow restrictor devices 40, 70, 100, 110, 120, 130, 140, 150, are more likely to be used, but the fluid flow restrictor devices 80, 90 can be used if necessary to produce the desired flow control.

Figure 24:
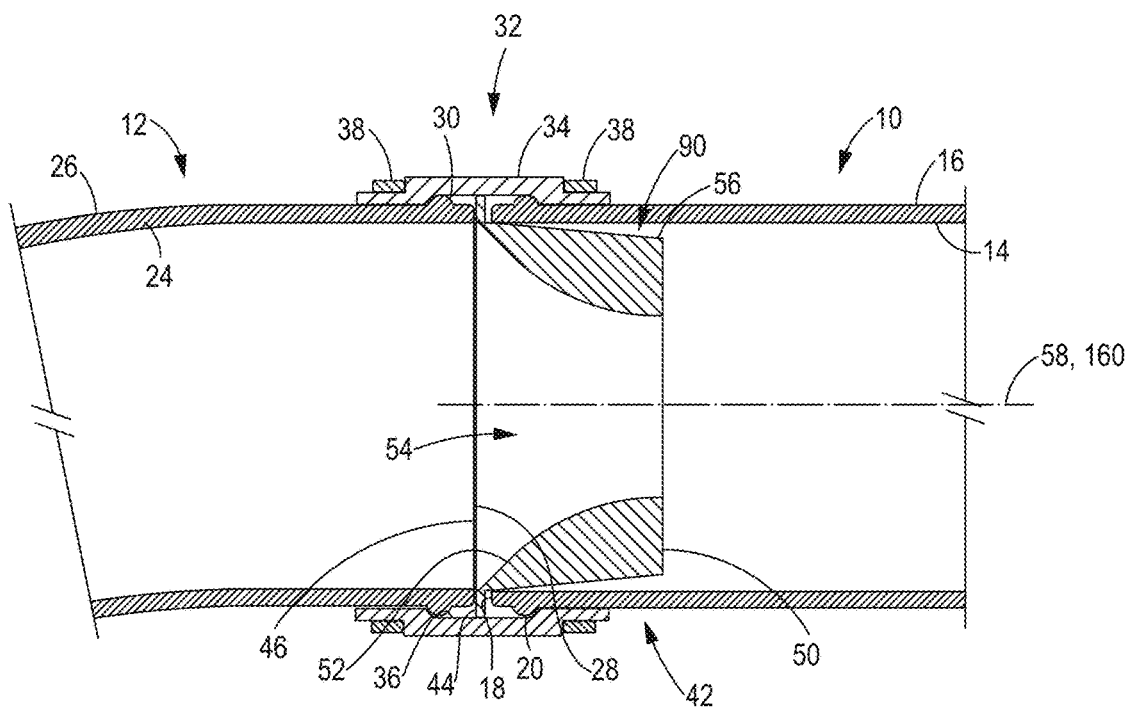
FIG. 24 is a side cross-sectional view of the components at the connection of FIG. 1 with the fluid flow restrictor device of FIG. 11 installed with the ducts.

FIG. 24 illustrates an implementation where a fluid flow restrictor device such as the fluid flow restrictor device 90 with a tapered restrictor device body 42 is installed. The outer body diameter $OD_B$ at the center point 60 is less than the first duct inner diameter $ID_{D1}$ to facilitate insertion of the center point 60 into the first duct 10. The outer body diameter $OD_B$ at the outboard restrictor device flange 44 is greater than the first duct inner diameter $ID_{D1}$ so that the edge at the intersection of the first duct inner surface 14 and the first duct open end surface 18 engages the body outer surface 56 at a point between the ends 46, 50 and may form a partial seal. The second duct 12 and the duct connection mechanism 32 are installed as described above to further force the restrictor device body 42 into the first duct 10 and form the seal at the connection. FIG. 24 further illustrates that it may be desirable to have the maximum body inner diameter $ID_{BMAX}$ at the outboard end 46 approximately equal to the first duct inner diameter $ID_{D2}$ to present a continuous surface as the flow transitions from the second duct 12 to the restrictor opening 54 and thereby minimize disruption to the fluid flow.

Figure 25:
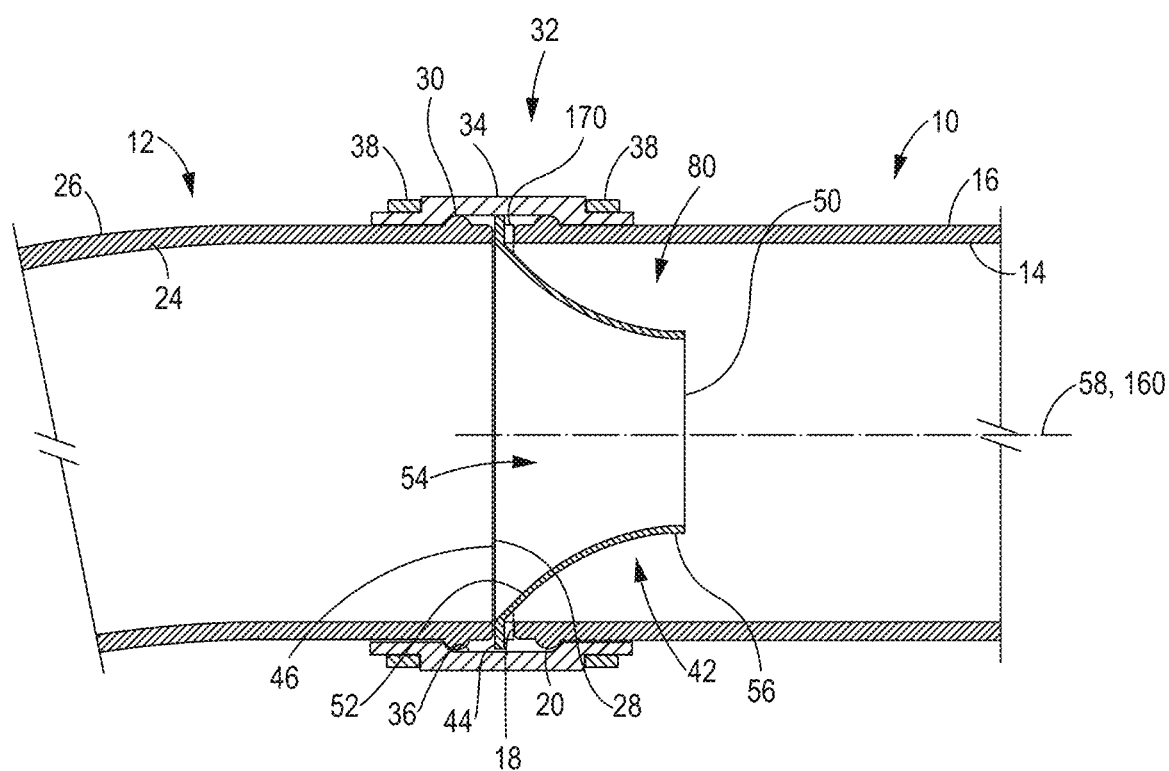
FIG. 25 is a side cross-sectional view of the components at the connection of FIG. 1 with the fluid flow restrictor device of FIG. 10 installed with the ducts.

In some implementations, the fluid flow restrictor device 80 may present a challenge for maintaining alignment of the fluid flow restrictor device 80 within the ducts 10, 12 due to a lack of engagement and support between the body outer surface 56 and the first duct inner surface 14. To provide additional support, an adhesive may be applied to the surfaces of the outboard restrictor device flange 44 to secure the outboard restrictor device flange 44 to the duct open end surfaces 18, 28 and prevent relative movement between the fluid flow restrictor device 80 and the ducts 10, 12. In the embodiment shown in FIG. 25, the duct connection mechanism 32 may include an alignment ring 170 that fits onto the restrictor device body 42. The alignment ring 170 has an annular shape with an alignment ring inner diameter that is greater than the outer body diameter $OD_B$ at the outboard restrictor device flange 44, and an alignment ring outer diameter that is greater than the first duct inner diameter $ID_{D1}$. The alignment ring 170 is disposed on the restrictor device body 42 and between the outboard restrictor device flange 44 and the first duct open end surface 18. The increased thickness provided by the alignment ring 170 may tighten the grip of the duct open end surfaces 18, 28 on the outboard restrictor device flange 44 to more firmly hold the fluid flow restrictor device 80 against movement relative to the ducts 10, 12. If necessary, the sides of the alignment ring 170 may be coated with an adhesive to adhere the alignment ring 170 to the outboard restrictor device flange 44 and the first duct open end surface 18 and hold the fluid flow restrictor device 80 in alignment.

The fluid flow restrictor devices in accordance with the present disclosure of a variety of solutions for achieving desired fluid flow control within a ducting system. The proper shape and dimensions may be chosen to provide the necessary flow restriction. Moreover, the texturing of the body inner surface 52 and the material from which the fluid flow restrictor device is fabricated are variable to meet a desired level of noise attenuation at the connection. The variety of options in fluid flow restrictor devices in accordance with the present disclosure and material selection and dimensioning may provide multiple alternative solutions for achieving desired fluid flow control in ducting systems.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A fluid flow restrictor device for controlling fluid flow at a connection between a first duct and a second duct, the fluid flow restrictor device comprising:
   a restrictor device body having an outboard end, an inboard end that is inserted into and disposed within the first duct when the fluid flow restrictor device is installed at the connection, a body inner surface defining a restrictor opening through the restrictor device body from the outboard end to the inboard end, and a body outer surface; and
   an outboard restrictor device flange extending radially outward at the outboard end of the restrictor device body and having an outboard flange outer diameter that is greater than a first duct inner diameter of the first duct so that the outboard restrictor device flange is engaged by a first duct open end surface of the first duct to prevent full insertion of the fluid flow restrictor device into the first duct when the fluid flow restrictor device is installed at the connection;
   wherein a body inner diameter of the restrictor device body decreases from a maximum body inner diameter at the outboard end as the body inner surface extends from the outboard end toward the inboard end until the body inner diameter is equal to a minimum body inner diameter; and wherein an inner diameter rate of change of the body inner diameter increases as the body inner diameter decreases from the maximum body inner diameter to the minimum body inner diameter.

2. A fluid flow restrictor device for controlling fluid flow at a connection between a first duct and a second duct, the fluid flow restrictor device comprising:
a restrictor device body having an outboard end, an inboard end that is inserted into and disposed within the first duct when the fluid flow restrictor device is installed at the connection, a body inner surface defining a restrictor opening through the restrictor device body from the outboard end to the inboard end, and a body outer surface; and
an outboard restrictor device flange extending radially outward at the outboard end of the restrictor device body and having an outboard flange outer diameter that is greater than a first duct inner diameter of the first duct so that the outboard restrictor device flange is engaged by a first duct open end surface of the first duct to prevent full insertion of the fluid flow restrictor device into the first duct when the fluid flow restrictor device is installed at the connection;
wherein a body inner diameter of the restrictor device body decreases from a maximum body inner diameter at the outboard end as the body inner surface extends from the outboard end toward the inboard end until the body inner diameter is equal to a minimum body inner diameter; and
wherein, when the body inner surface is viewed in cross-section taken through a plane that is parallel to a body longitudinal axis of the restrictor device body and has the body longitudinal axis lying within the plane, the body inner surface has a constant radius of curvature as the body inner surface extends from the outboard end toward the inboard end.

3. The fluid flow restrictor device of claim 1, wherein the body inner diameter increases from the minimum body inner diameter as the body inner surface continues extending toward the inboard end.

4. The fluid flow restrictor device of claim 1, wherein the body inner diameter is constant at the minimum body inner diameter as the body inner surface continues extending toward the inboard end for a constricted section length.

5. The fluid flow restrictor device of claim 4, wherein, after the body inner diameter is constant for the constriction section length, the body inner diameter increases from the minimum body inner diameter as the body inner surface continues extending toward the inboard end.

6. The fluid flow restrictor device of claim 1, wherein the restrictor device body has a constant body wall thickness between the body inner surface and the body outer surface.

7. The fluid flow restrictor device of claim 1, wherein a body outer diameter of the body outer surface has an outer diameter rate of change that decreases at a constant rate from a maximum body outer diameter at the outboard end to a minimum body outer diameter at the inboard end as the body outer surface extends from the outboard end toward the inboard end, and wherein the minimum body outer diameter is less than the first duct inner diameter and the maximum body outer diameter is greater than the first duct inner diameter.

8. The fluid flow restrictor device of claim 1, wherein the body inner surface comprises a plurality of body inner surfaces each defining a restrictor opening through the restrictor device body from the outboard end to the inboard end.

9. A fluid flow system, comprising:
a first duct having a first duct inner surface with a first duct inner diameter and a first duct open end surface;
a second duct having a second duct inner surface with a second duct inner diameter and a second duct open end surface;
a fluid flow restrictor device comprising:
a restrictor device body having an outboard end, an inboard end, a body inner surface defining a restrictor opening through the restrictor device body from the outboard end to the inboard end, and a body outer surface, and
an outboard restrictor device flange extending radially outward at the outboard end of the restrictor device body and having an outboard flange outer diameter that is greater than the first duct inner diameter, wherein the inboard end is inserted into the first duct until the outboard restrictor device flange is engaged by the first duct open end surface to prevent full insertion of the fluid flow restrictor device into the first duct;
a duct connection mechanism engaging the first duct and the second duct to substantially prevent relative movement between the first duct and the second duct and to retain the fluid flow restrictor device installed within the first duct; and
an alignment ring having an annular shape, an alignment ring inner diameter that is greater than a body outer diameter, and an alignment ring outer diameter that is greater than the first duct inner diameter, wherein the alignment ring is disposed on the body outer surface and between the outboard restrictor device flange and the first duct open end surface.

10. The fluid flow system of claim 9, wherein a body inner diameter of the restrictor device body at the outboard end is approximately equal to the second duct inner diameter.

11. The fluid flow system of claim 9, wherein the fluid flow restrictor device comprising an inboard restrictor device flange extending radially outward at the inboard end of the restrictor device body and having an inboard flange outer diameter that is less than the first duct inner diameter.

12. The fluid flow system of claim 9, wherein a body outer diameter of the body outer surface decreases at a constant rate from a maximum body outer diameter at the outboard end to a minimum body outer diameter at the inboard end as the body outer surface extends from the outboard end toward the inboard end, and wherein the minimum body outer diameter is less than the first duct inner diameter and the maximum body outer diameter is greater than the first duct inner diameter, and wherein the restrictor device body is inserted into the first duct until the body outer surface is engaged by the first duct inner surface.

13. A method of controlling fluid flow at a connection between a first duct and a second duct, comprising
inserting an inboard end of a restrictor device body of a fluid flow restrictor device through a first duct open end surface and into the first duct, wherein a portion of the fluid flow restrictor device has an outer diameter that is greater than a first duct inner diameter of a first duct inner surface so that the portion of the fluid flow restrictor device wherein a body outer surface of the restrictor device body is tapered such that a body outer diameter decreases from a maximum body outer diameter proximate the outboard end to a minimum body outer diameter proximate the inboard end, wherein the maximum body outer diameter is greater than the first duct inner diameter and the minimum body outer diameter is less than the first duct inner diameter, and wherein the portion of the fluid flow restrictor device is a location on the body outer surface at which the body outer diameter is equal to the first duct inner diameter and is engaged by an edge at an intersection of the first duct inner surface and the first duct open end surface is engaged by the first duct to prevent an outboard end of the fluid flow restrictor device from being completely inserted into the first duct, and wherein the restrictor device body has a body inner surface extending through the restrictor device body from the outboard end to the inboard end and defining a restrictor opening through the fluid flow restrictor device;

contacting the outboard end of the fluid flow restrictor device with a second duct open end surface of the second duct; and engaging the first duct and the second duct with a duct connection mechanism to substantially prevent relative movement between the first duct and the second duct and to form a seal between the first duct, the second duct and the fluid flow restrictor device.

14. The method of controlling fluid flow of claim 13, an outboard restrictor device flange extends radially outward at the outboard end of the restrictor device body and having an outboard flange outer diameter that is greater than the first duct inner diameter, and wherein the outboard restrictor device flange is engaged by the first duct open end surface to prevent an outboard end of the fluid flow restrictor device from being completely inserted into the first duct.

15. The fluid flow system of claim 9, wherein a body inner diameter of the body inner surface increases from a minimum body inner diameter as the body inner surface continues extending toward the inboard end.

16. The fluid flow system of claim 9, wherein the body inner diameter is constant at the minimum body inner diameter as the body inner surface continues extending toward the inboard end for a constricted section length.

17. The fluid flow system of claim 16, wherein, after the body inner diameter is constant for the constriction section length, the body inner diameter increases from the minimum body inner diameter as the body inner surface continues extending toward the inboard end.

18. The fluid flow restrictor device of claim 9, wherein the restrictor device body has a constant body wall thickness between the body inner surface and the body outer surface.

19. The fluid flow restrictor device of claim 9, wherein the body inner surface comprises a plurality of body inner surfaces each defining a restrictor opening through the restrictor device body from the outboard end to the inboard end.

20. The method of controlling fluid flow of claim 13, wherein the body outer diameter of the body outer surface decreases at a constant rate from the maximum body outer diameter at the outboard end to the minimum body outer diameter at the inboard end as the body outer surface extends from the outboard end toward the inboard end.

* * * * *